United States Patent
White et al.

(10) Patent No.: US 7,020,684 B2
(45) Date of Patent: Mar. 28, 2006

(54) SYSTEM AND METHOD FOR OPTIMISTIC CACHING

(75) Inventors: Seth White, San Francisco, CA (US); Adam Messinger, San Francisco, CA (US); Dean Bernard Jacobs, Berkeley, CA (US); Rob Woollen, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 367 days.

(21) Appl. No.: 10/340,023

(22) Filed: Jan. 10, 2003

(65) Prior Publication Data

US 2003/0233522 A1 Dec. 18, 2003

Related U.S. Application Data

(60) Provisional application No. 60/349,464, filed on Jan. 18, 2002.

(51) Int. Cl.
*G06F 12/00* (2006.01)

(52) U.S. Cl. ............ 709/203; 709/213; 709/214; 709/215; 709/223; 709/224; 707/8; 707/10; 707/200; 707/201

(58) Field of Classification Search ........... 709/203, 709/213, 214, 215, 223, 224; 707/8, 10, 707/200, 201
See application file for complete search history.

(56) References Cited

U.S. PATENT DOCUMENTS

| 5,261,069 | A |   | 11/1993 | Wilkinson et al. ......... 395/425 |
| 5,581,753 | A |   | 12/1996 | Terry et al. |
| 5,878,213 | A | * | 3/1999  | Bittinger et al. ............ 709/203 |
| 6,012,059 | A |   | 1/2000  | Neimat et al. ................ 707/8 |
| 6,086,632 | A |   | 7/2000  | Hirotani ....................... 717/5 |
| 6,240,413 | B1 |  | 5/2001  | Learmont ..................... 707/8 |
| 6,542,926 | B1 | * | 4/2003 | Zalewski et al. .......... 709/213 |
| 2003/0050972 | A1 | | 3/2003 | Felt et al. |
| 2003/0200350 | A1 | | 10/2003 | Kumar et al. |
| 2004/0254921 | A1 | * | 12/2004 | Cohen et al. ................ 707/3 |

* cited by examiner

*Primary Examiner*—Donald Sparks
*Assistant Examiner*—Ngoc V Dinh
(74) *Attorney, Agent, or Firm*—Fliesler Meyer LLP.

(57) ABSTRACT

Transactions are granted concurrent access to a data item through the use of an optimistic concurrency algorithm. Each transaction gets its own instance of the data item, such as in a cache or in an entity bean, such that it is not necessary to lock the data. The instances can come from the data or from other instances. When a transaction updates the data item, the optimistic concurrency algorithm ensures that the other instances are notified that the data item has been changed and that it is necessary to read a new instance, from the database or from an updated instance.

This description is not intended to be a complete description of, or limit the scope of, the invention. Other features, aspects, and objects of the invention can be obtained from a review of the specification, the figures, and the claims.

24 Claims, 3 Drawing Sheets

SYSTEM AND METHOD FOR OPTIMISTIC CACHING

CLAIM OF PRIORITY

This application claims priority from U.S. Provisional Patent Application No. 60/349,464 entitled "SYSTEM AND METHOD FOR OPTIMISTIC CACHING" by White, et al. filed Jan. 18, 2002, incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS REFERENCE TO RELATED PATENT DOCUMENTS

The following co-pending U.S. patent documents are assigned to BEA Systems, Inc., the assignee of the present application, and these documents are hereby incorporated herein by reference:

(A) U.S. patent application Ser. No. 10/340,067 filed, Jan. 10, 2003, to Seth White et al., and entitled, "System and Method for Heterogeneous Caching"; and (B) U.S. patent application Ser. No. 10/340,301 filed Jan. 10, 2003, to Seth White et al., and entitled, "System and Method for Read-Only Entity Beam Caching"; and (C) U.S. patent application Ser. No. 09/975,590, filed Oct. 11, 2001 to Dean Jacobs et al., and entitled, "Data Replication Protocol".

FIELD OF THE INVENTION

The invention relates to the caching of data for multiple transactions.

BACKGROUND

In a system where multiple users desire concurrent access to the same data, a concurrency model such as exclusive concurrency can be used to provide such access. In such a model, each server instance manages an exclusive lock on a primary key and any data associated with that key. This lock is held for the length of the transaction when invoked for a transaction. In the case of a non-transactional invoke, such as for a method that requires access to, but will not update, the data, the lock is held until the method completes. In a clustered environment, it is possible that a given primary key is active in multiple servers. In such a situation, concurrency control is typically provided by the database.

The exclusive concurrency model works well in a single server system in which the server has exclusive access to the database. A sharing value, such as "db-is-shared" can be set to false, such that the any read of the data can read from an instance in an in-memory cache instead of reading from the database.

Problems arise, however, as the exclusive concurrency model requires the use of deadlocks. Deadlocking can occur when users have locks on separate objects, and one of the users is trying to acquire a lock on an object that is locked by another user. Beans holding instances of the data can also deadlock themselves if the beans are called within a transaction and subsequently called without a transaction.

Other systems provide the ability for each transaction to activate a unique instance of the data. These systems do not provide concurrency control within the application server, however, but rely on the database for concurrency. This database concurrency model is an improvement over exclusive concurrency, but it is still necessary to hit the database for every transaction. This approach can still strain system resources under load.

BRIEF SUMMARY

Systems and methods in accordance with embodiments of the present invention can overcome these and other deficiencies in the prior art by providing an optimistic approach to concurrency. In one embodiment, a first instance of a data item is read into a first cache for a first transaction. The first data item can be read from the database or from the cache for a previous transaction. A second instance of the data item is read into a second cache for a second transaction. The second cache can read from the first cache, from the database, or from a cache for a previous transaction. The data item in the database can then be updated by committing changes for one of the transactions. The changes can also be committed to the cached instance of the data item for that transaction. An optimistic concurrency algorithm directs the updating cache to notify the other cache that the data item has changed and that the other instance is not current. The outdated cache can then drop its instance of the data item and read a new instance. The outdated cache can read the new instance from the database, from the updated cache, or from a cache for a previous transaction.

Other features, aspects and objects of the invention can be obtained from a review of the specification, the figures, and the claims.

DETAILED DESCRIPTION

Systems and methods in accordance with one embodiment of the present invention can overcome deficiencies in prior art concurrency models by utilizing "optimistic caching" or "optimistic concurrency". Using optimistic concurrency, it is not necessary for each transaction to read from the database and consume system resources unnecessarily.

The approach is referred to herein as "optimistic" because a server instance does not get a lock on the data being used by a transaction. Transactions are optimistic about the fact that no changes are going to be made to the data while it is being used by that transaction. Under this belief, there is no need to lock the data since it will not change during the transaction. Since the data is not locked, it can be used concurrently by multiple users.

In order to assure the accuracy of transactions using that data, however, it will be necessary to determine whether the underlying data actually changed before transactional changes are written to the database.

An invalidation scheme can be used to facilitate optimistic caching in a clustered environment, such that multiple machines in a cluster can run an optimistic algorithm in parallel. When changes are made, the machines can communicate with each other that a change has occurred, and can indicate what those changes are. This can help to avoid an optimistic conflict or exception at the end of a transaction. XML can be used with such a system, as XML provides a declarative way for a user to indicate that optimistic caching is to be used.

Figure 1:
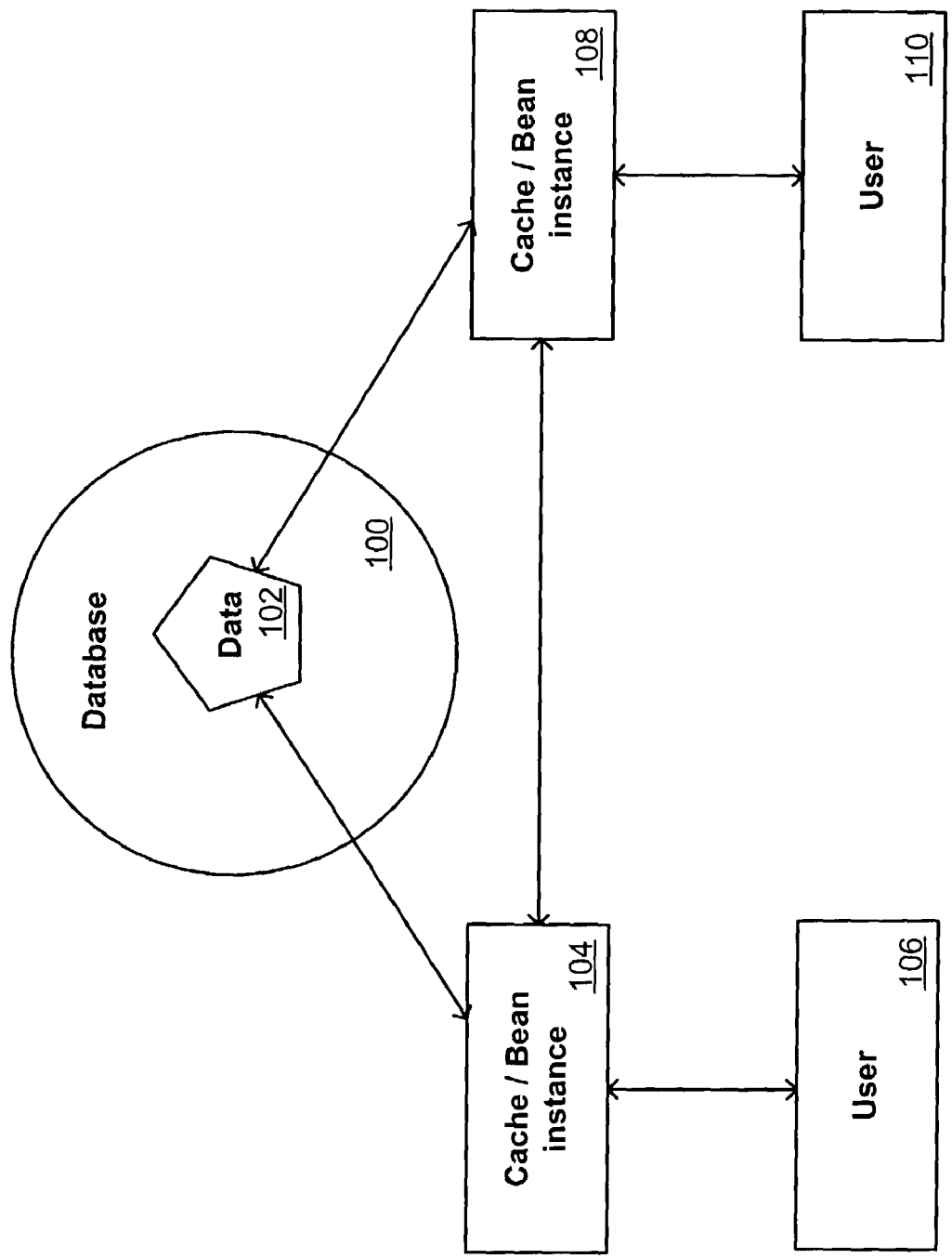
FIG. 1 is a diagram of a system in accordance with one embodiment of the present invention.

Such a system is shown in FIG. 1. A data item 102 is stored in a database 102. User 106 and user 110 may both want access to the data item 102 concurrently. Since the data item is not locked, an instance of the data item can be read into a cache or bean instance 104 for user 106, and a second instance can be read into a cache or bean instance 108 for user 110. If user 106 updates the data item 102, the optimistic algorithm can direct cache 104 to notify cache 108. The algorithm can also instruct the transaction for user 106 to update the instance of the data item in cache 104. If the instance in cache 104 is updated, cache 108 can read a new instance from cache 104. If cache 104 is not updated, cache 110 can read from the database 100.

Figure 2:
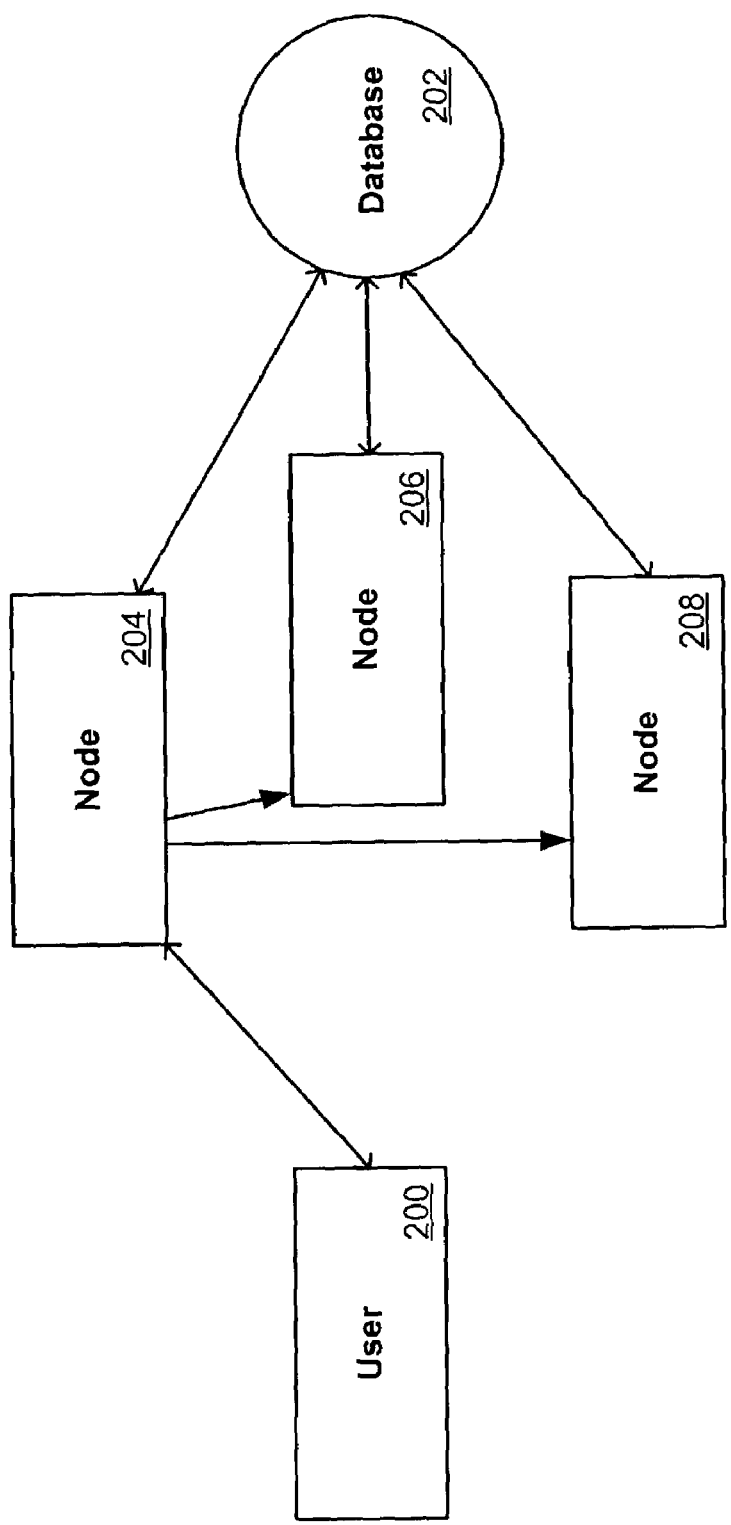
FIG. 2 is a diagram of a system in accordance with another embodiment of the present invention.

There can be multiple nodes in a cluster that are able to access and make changes to the data in the database, as shown in FIG. 2. In order to make efficient use of a cluster, an application can evenly utilize any available cluster nodes 204, 206, 208. For instance, a user 200 that wishes to utilize data in the database 202 can be directed to work through node 204. The user is not aware of which node is being utilized, as the nodes appear to the user as a single server. An object can migrate from one node to another in support of even load distribution.

It can be beneficial for these nodes to notify each other about any changes made to data. In FIG. 2, node 204 is shown to be able to send an update message to nodes 206 and 208 in the event that the user 200 updates data in the database 202. Such information can prevent other nodes from having to wait until the end of a transaction to find out that the data has changed. If a node does not find out about the change until the end of a transaction, the node will need to rollback the transaction, obtain the updated state of the data, and restart the processing of the transaction. This notification of nodes in a cluster can save both time and resources by preventing the reprocessing of transactions. Different schemes can be used that allow the nodes to notify themselves of changes in the data.

Figure 3:
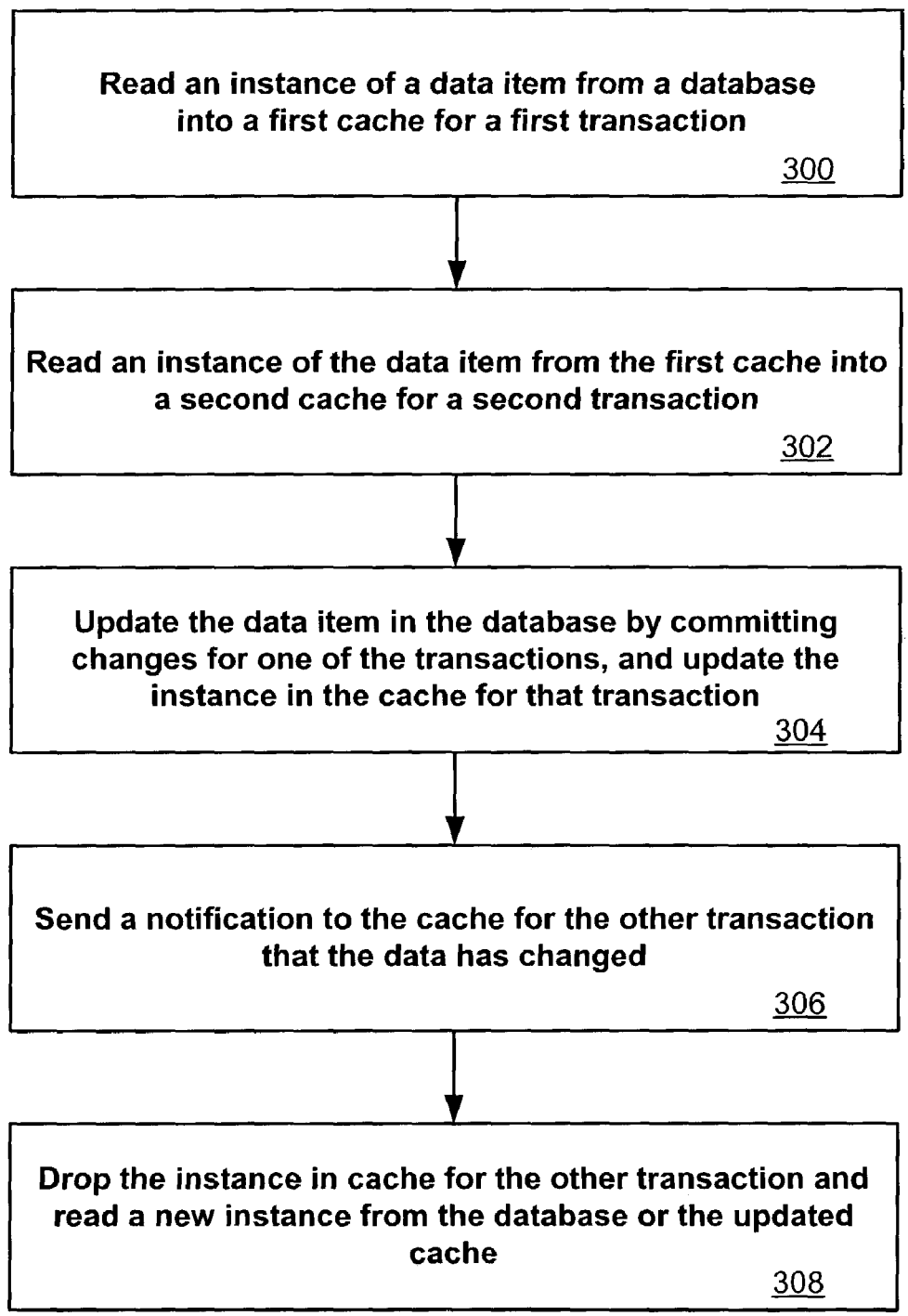
FIG. 3 is a flowchart showing the steps of a method in accordance with the embodiment of the FIG. 1.

FIG. 3 shows steps for a method that could be used with a system in accordance with the embodiment of FIG. 1. In this method, an instance of a data item is read into a first cache for a first transaction 300. An instance of the data item is then read from the first cache into a second cache for a second transaction 302. One of the transactions can update the data item in the database by committing changes to the data item, and can also update the associated instance in cache 304. A notification can then be sent to the cache for the other transaction notifying the cache that the data item has changed 306. That cache can then drop its instance of the data item and read a new instance from the database or from the updated cache 308.

Certain operations can be done outside of a transaction. One such operation involves suspending the active transaction while reading data. This operation can be a global transaction, for example, that spans multiple nodes about the network and can be committed using a two-phase commit algorithm.

"Creates" and "removes" can be done within the context of global transactions, such that if a global transaction rolls back then the operations can be rolled back as well. Long-term locks can be held during these operations. During the load, a copy of the data can be made so that the data is read during a short-term transaction. An initial copy of the data being read can be made. The transaction can then actually update a different copy of the data, such that at the end of the transaction those copies can be compared with what is in the database, in order to help determine whether to commit the transaction.

Enterprise JavaBeans

This optimistic caching can also be done with Enterprise JavaBeans (EJBs). An EJB has a life cycle, and certain embodiments of optimistic caching work within the context of this life cycle. The EJBs can load themselves from the database and can store themselves in the database. The EJBs can also undergo other operations, such as loading, storing, creating, removing, passivating, and activating. EJBs can also read data in a local transaction. This allows the EJBs to read data items without acquiring long-term locks on the data.

Caching Between Transactions

In one embodiment, optimistic caching allows for the caching of data between separate transactions. In prior art systems where every transaction reads from the database, entity beans holding instances of the data do not perform any better than stateless session beans. In order to better utilize the functionality and advantages of entity beans, caching can be done between transactions to the extent possible.

One way to accomplish between-transaction caching is to read data in a local transaction so there is no need for long-term locks. At the end of the transaction, the data can be checked to determine if anyone has made any changes. In one such system, a "db-is-shared" or equivalent tag can be replaced with a tag such as "AppServerCachingEnabled", which can allow the caching of entity beans between transactions when AppServerCachingEnabled has a value of "true".

In a more optimistic embodiment for caching between transactions, data is not read at the beginning of a transaction. It is assumed that what is in cache from a previous transaction is still current with what is in the database. The currency of the data is not checked until the end of the transaction. This allows the transaction to use what is already in cache memory, which can greatly increase the speed of the transaction. If the transaction attempts to commit and finds the data has changed, it can update the data in cache so that the next transaction can read from cache and have the appropriate value.

CMP Optimistic Concurrency without Caching

There are other optimistic concurrency embodiments that can support the EJB 2.0 Container-Managed Persistence (CMP) specification, and can be used with or without caching between transactions.

In an optimistic concurrency approach without caching, each transaction can activate its own bean instance. There is no locking within the application server. Two new tags can be used, such as "OptimisticVerifyModifiedFields" and "OptimisticVerifyReadFields". With these options, a database read can occur as a separate local transaction. In the case of OptimisticVerifyReadFields, the update statement can verify that every field that was read in the transaction matches the current content in the database. OptimisticVerifyModifiedFields can be used to check only the fields that have been updated. The transaction can abort if the update conditions fail. If the transaction is a read-only transaction, it will not produce an update statement and there will be no verification.

Such a system can utilize special abstract methods for CMP fields such as "increment", "decrement", and "decrementGreaterThan". For example, if there is an item being purchased at an online store by several users concurrently, each individual transaction simply wants to decrease the inventory amount by one unit. Each transaction is able to commit the update as long as the inventory is greater than zero units. The transaction does not care about how many units are in inventory, as long as there is at least one. Therefore, an operator could be used such as:

public abstract void decrementInventoryIfGreaterThan(int n);

A SQL statement could then be issued such as:

update set inventory=inventory-1 where inventory>0 and pk='item';

CMP Optimistic Concurrency with Caching

The OptimisticVerifyModifiedFields and OptimisticVerifyReadFields could also be used as the basis for clustered entity bean caching. A server could keep a cache that associates a primary key and field group with cached data. In a CMP 2.0 implementation, a field group can be a set of container-managed fields. When one member of a group needs to be read from the database, the entire group is read. By default, the CMP fields can be in a single group, but this can be changed using a deployment descriptor, for example.

When an entity bean reads a field group, it can ask the cache for the field group. If the cache has the field group in memory, it can return the cached data instead of fetching the data from the database. When an updating transaction commits, the changes can be entered into the cache as well as into the database. This allows the cache to have the most recent data without having to hit the database. The cache can also measure the hit rate and optimistic rollback rate. These statistics can be used to drop or pre-fetch cached data.

Multicast Invalidation

It can be useful to prevent some of the optimistic rollbacks that can occur if, for example, a first server updates a value and then a second server reads from the second server's outdated or "stale" cache. One way to prevent this is to send invalidation messages between the caches. When an update commits, an invalidation can be sent to the other caches, such as by multicast. The message can contain, for example, the JNDI name, the primary key, and the field group number.

When an ejb cache receives an update message, the cache can drop the corresponding field group from its cache. If this field group has a high hit rate, the cache can pre-fetch the new version.

While these invalidation messages can help prevent optimistic rollbacks, they do not ensure correctness. The predicated update can be used to ensure that the read or modified fields are consistent with that which is still in the database.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system for concurrently caching instances of a data item, comprising:
    a database capable of storing a data item;
    a plurality of cluster nodes, each cluster node capable of executing a transaction using the data item;
    a cache for each cluster node executing a transaction, the cache capable of storing an instance of the data item; and
    an optimistic caching algorithm running concurrently on each cluster node, the algorithm capable of directing each cluster node to notify the other cluster nodes when updating the data item in the database, wherein the data item is stored in Enterprise beans in the caches.

2. A system according to claim 1, wherein:
    each of said plurality of cluster nodes is further capable of checking the data item in the database before updating the data item.

3. A method for concurrently caching instances of a data item, comprising:
    reading a first instance of a data item into a first cache for a first transaction;
    reading a second instance of the data item into a second cache for a second transaction;
    updating the data item using the first transaction; and
    notifying the second cache that the instance of the data item in the second cache is not current with the data item.

4. A method according to claim 3, further comprising:
    dropping the instance of the data item in the second cache that is not current with the data item.

5. A method according to claim 3, further comprising:
    reading a new instance of the data item into the second cache by reading the data item from the database.

6. A method according to claim 3, further comprising:
    reading a new instance of the data item into the second cache by reading the instance of the data item from the first cache.

7. A method according to claim 3, further comprising:
    updating the first instance of the data item for the first transaction.

8. A method according to claim 3, wherein:
    reading a second instance of the data item into a second cache for a second transaction further comprises reading the second instance from the database.

9. A method according to claim 3, wherein:
    reading a second instance of the data item into a second cache for a second transaction further comprises reading the second instance from the first cache.

10. A method according to claim 3, further comprising:
    managing the first cache and second cache with an optimistic concurrency algorithm.

11. A method according to claim 3, further comprising:
    verifying the currency of the first instance before updating the data item using the first transaction.

12. A method according to claim 3, wherein:
    notifying the second cache further comprises notifying the second cache by sending a multicast notification.

13. A method for concurrently caching instances of a data item, comprising:
    reading a first instance of the data item to a first enterprise bean for a first transaction;

reading a second instance of the data item to a second enterprise bean for a second transaction;
updating the data item using the first transaction; and
notifying the second enterprise bean that the instance of the data item in the second enterprise bean is not current with the data item.

14. The method of claim 13, wherein:
the second instance is updated with an updated instance of the data item from the first instance of the data item.

15. The method of claim 13, wherein:
the notifying step further comprises multicasting a notification to multiple second enterprise beans.

16. A system for concurrently caching instances of a data item, comprising:
a plurality of nodes, each node capable of executing a transaction wherein the transaction is adapted to use an instance of a data item derived from a data item stored in a database;
at least one cache associated with the plurality of nodes, each cache being capable of storing the instance of a data item; and
an optimistic caching algorithm running concurrently on at least some of the plurality of nodes, the optimistic caching algorithm capable of directing each node to notify the other nodes when updating the data item in the database wherein the data item is stored in Enterprise beans in the caches.

17. The system of claim 16, further comprising:
a plurality of caches, wherein each cache is associated with one of the plurality of nodes.

18. The system of claim 16, wherein:
the instances of data items in the plurality of caches can be updated from at least one of the data item stored in the database and the instance of the data item associated with another of said plurality of caches.

19. A method for concurrently caching instances of a data item, comprising:
reading a first instance of the data item into a first cache, said first instance associated with a first transaction;
reading a second instance of the data item into a second cache, said second instance associated with a second transaction;
updating the data item using the first transaction;
notifying the second cache that the instance of the data item in the second cache is not current with the data item wherein the data item is stored in Enterprise beans in the caches.

20. A method for concurrently caching instances of a data item comprising the steps of:
first reading a first instance of a data item into a first cache that is associated with a first transaction, which first reading step can employ one of a reading from a database and a reading from a cache for a previous transaction; and
second reading a second instance of the data item into a second cache associated with a second transaction, which second reading step includes one of reading from a database, reading from the first cache, and reading from a cache for a previous transaction wherein the data item is stored in Enterprise beans in the caches.

21. The method of claim 20, further comprising:
updating the data item in the database with changes from a transaction.

22. The method of claim 20, further comprising:
notifying the other caches that the data item has changed and that the instance of the date item in the notified cache is not current, when an instance of a data item has changed in a cache.

23. The method of claim 20, further comprising:
using an optimistic concurrency algorithm to keep the instances of the data item current.

24. A system for concurrently caching instances of a data item, comprising:
a plurality of nodes, each node capable of executing a transaction, the transaction adapted to use an instance of a data item derived from a data item stored in a database;
at least one cache associated with the plurality of nodes, each cache capable of storing the instance of a data item; and
an optimistic caching algorithm running concurrently on at least some of the nodes, said optimistic caching algorithm capable of directing each node to notify the other nodes when one of a data item has changed, and an instance of a data item has changed wherein the data item is stored in Enterprise beans in the caches.

* * * * *